United States Patent [19]

Le Beau

[11] Patent Number: 5,012,524
[45] Date of Patent: Apr. 30, 1991

[54] AUTOMATIC INSPECTION METHOD

[75] Inventor: Christopher J. Le Beau, Tempe, Ariz.

[73] Assignee: Motorola, Inc., Schaumburg, Ill.

[21] Appl. No.: 315,645

[22] Filed: Feb. 27, 1989

[51] Int. Cl.$^5$ ............................................. G06K 9/00
[52] U.S. Cl. ........................................... 382/8; 382/22
[58] Field of Search .................... 382/8, 54, 52, 22, 55; 364/513, 518

[56] References Cited

U.S. PATENT DOCUMENTS

| | | | |
|---|---|---|---|
| 4,581,762 | 4/1986 | Lapidus et al. | 382/8 |
| 4,707,647 | 11/1987 | Coldran et al. | 318/568 |
| 4,910,786 | 3/1990 | Eichel | 382/22 |
| 4,929,893 | 5/1990 | Sato et al. | 382/8 |

Primary Examiner—David K. Moore
Assistant Examiner—Tan Dinh
Attorney, Agent, or Firm—Joe E. Barbee

[57] ABSTRACT

A method for automatically inspecting articles or work pieces uses a solid state television camera to obtain images of the article. An edge enhancement is done to obtain a first and a second threshold level which are dilated to eliminate noise edges. An edge correlation is then performed to determine orientation of the article. Gray scale or gray level imaging of the surface of the device is then performed and compared against a known device surface in order to determine acceptability of the device under inspection. The gray scale imaging techniques used are robust gray scale image processing that are tolerant to significant variations in image luminance or image degradation and is capable of identifying and classifying image features consistently while in the presence of such luminance variations. The data is then statistically characterized and the results used for real time statistical process control of the work piece process.

7 Claims, 3 Drawing Sheets

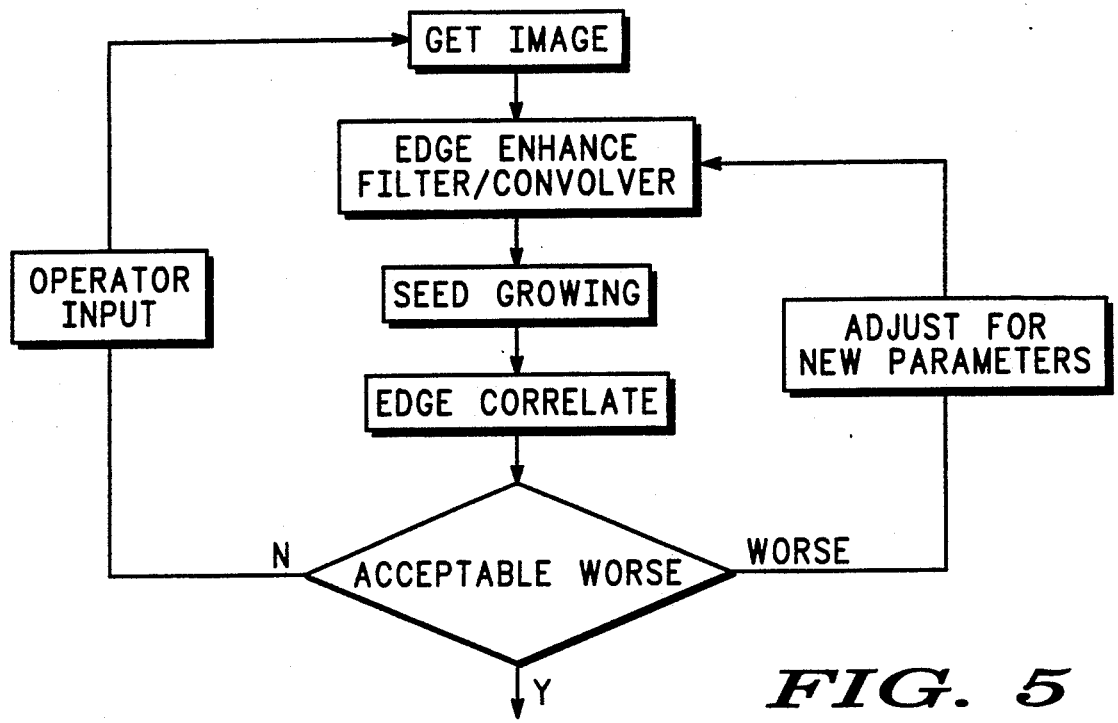
FIG. 5
FIG. 6
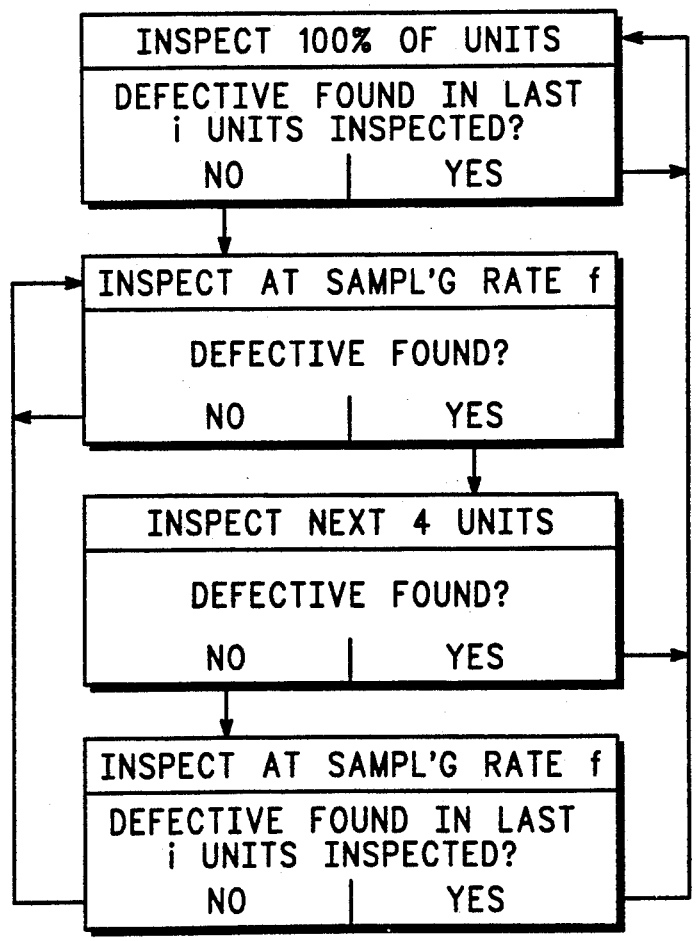

AUTOMATIC INSPECTION METHOD

BACKGROUND OF THE INVENTION

This invention relates, in general, to methods for automatically inspecting items, and more particularly, to a method for automatically inspecting the location and surface of a device.

During the assembly of components in a manufacturing cycle it becomes necessary to verify the location, alignment, and condition of articles being used in the cycle. This is particularly true in an automated or semi-automated assembly cycle. Lasers have been used in some applications to determine the actual position of articles. However, lasers are expensive and complex to implement. More recently solid state television cameras have been used to visually monitor an article. The data from the camera can then be processed in a digital manner to determine the coordinate location of the article. However, the manner in which the data is processed determines the speed and accuracy of the monitoring system.

Accordingly, it is an object of the present invention to provide an improved method of manipulating data to automatically inspect an article.

Another object of the present invention is to provide a method to automatically inspect an article in a manner that is fast and accurate.

Yet another object of the present invention is to provide visual data and a statistical summary of such in a real time automatic fashion so that it can be used in a feedback process control system.

A further object of the present invention is to use gray scale imaging techniques for intelligently thresholding the gray scale edge-enhanced image to obtain binary direction edge features.

SUMMARY OF THE INVENTION

The above and other objects and advantages of the present invention are achieved by obtaining an image of an article and performing a gray level edge enhancement establishing a first and a second threshold value for the edge data wherein the second threshold value is a higher level than the first threshold value. The second threshold value is then dilated with the first threshold value to conditionally grow prominent edge features of interest while not growing any noise edge points. This provides edges of the article being inspected which are directionally edge-enhanced and then separately intelligently extracted to provide the desired edge features. Each individual direction edge image is then shifted and summed in a fashion representative of discretely identified edge point offset references. Each discrete point is assigned a weighting value. The sum of the weighted values can be used to determine the correctness of the edge feature.

The present invention also covers a method of characterizing the gray level surface of an article by means of comparing a known surface to the surface of an article being inspected. The surface is partitioned into a plurality of regions and the average gray scale value for each of the regions is determined. The values obtained for each of the regions for a known article are then subtracted from the values obtained for an article under inspection. The difference values are then arranged from largest to smallest values to obtain normalized values. The smallest value is then subtracted from a center value to obtain a first index (1). The difference between the center value and the largest value is also determined to obtain a second index (2). The magnitude of indices 1 and 2 determine if the surface of the article is normal or abnormal, as compared to the surface of the known article.

BRIEF DESCRIPTION OF THE DRAWINGS

FIG. 5 illustrates in flow diagram form an inspection process; and

FIG. 6 illustrates how data from the present invention can be used in the system illustrated in FIG. 2.

DETAILED DESCRIPTION OF THE DRAWINGS

In describing the present invention the term gray scale and gray level are considered to have the same meaning and therefore interchangeable. The phrase "robust gray scale image processing" is defined as gray scale imaging techniques that are tolerant to significant variations in image luminance or image degradation and will therefore identify and classify image features consistently while in the presence of such variations.

Figure 1:
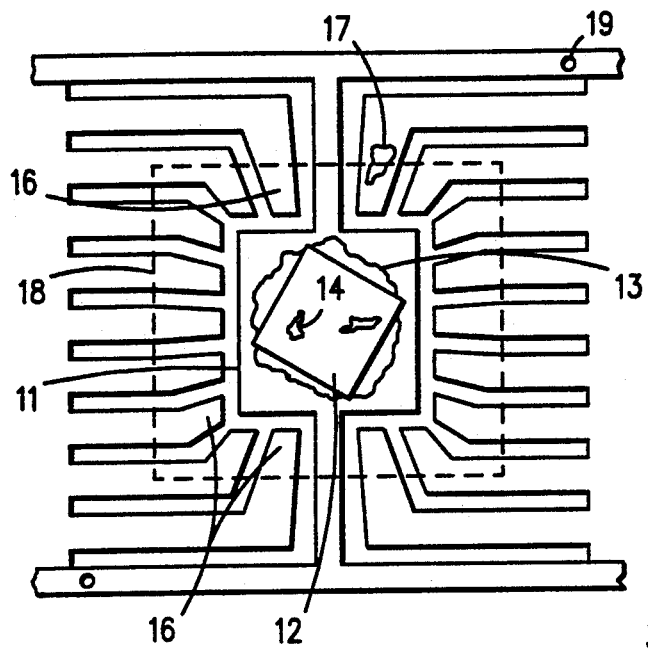
FIG. 1 illustrates an article that can be automatically inspected by the present invention.

FIG. 1 is an article which can be readily inspected by use of the present invention. Illustrated is a portion of a leadframe 10 having a die flag or heatsink 11. Illustrated attached to heatsink 11 is a semiconductor chip 12 which is held to heatsink 11 by an epoxy 13. Epoxy 13 is illustrated as flowing past the boundaries of chip 12. Chip 12 is illustrated as being slightly out of alignment on heatsink 11 and is a problem that is readily detectable with the practice of the present invention. Also illustrated on chip 12 are surface defects 14. Leadframe 10 has a plurality of lead fingers 16. After chip 12 is properly bonded to heatsink 11, a plurality of thin wires (not shown) are then used to interconnect lead fingers 16 to contact points (not shown) on chip 12. Leadframe 10 has indexing holes 19 which are used to move leadframe 10 past a work station. Illustrated in phantom is a field of view 18. Foreign matter 17 is illustrated on one lead finger 16 to illustrate an undesirable feature which is easily detectable in the practice of the present invention.

Figure 2:
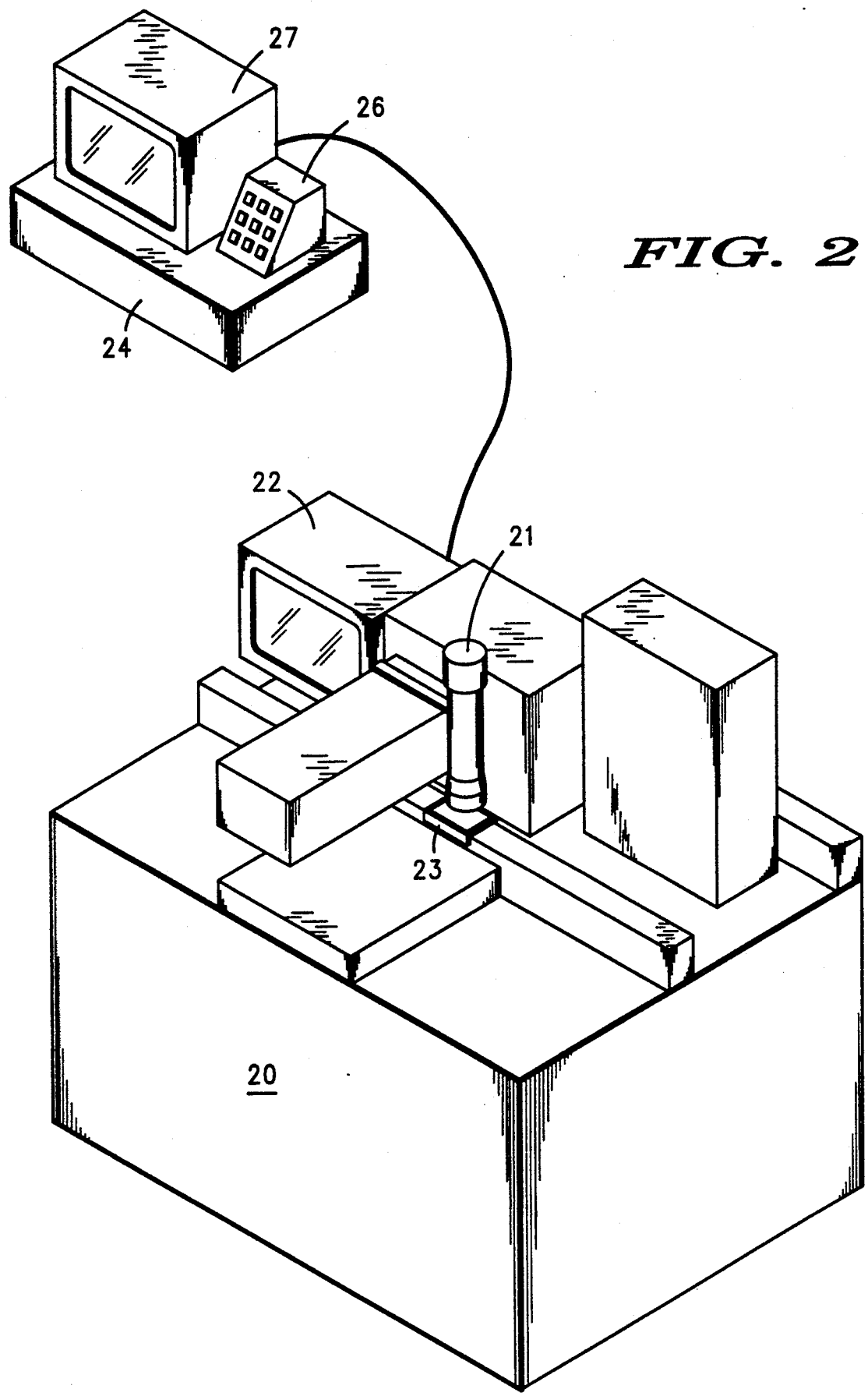
FIG. 2 illustrates a system useful in practicing the present invention.

FIG. 2 illustrates a system in which the present inspection method can be practiced. Illustrated is a die bond station having a die bonder 20. A solid state television camera 21 is positioned over a leadframe alignment mechanism 23. Leadframe alignment mechanism 23 can accommodate leadframe 10 (FIG. 1). Camera 21 includes optics and lighting. A local monitor 22 is located near camera 21. Also mounted on die bonder 20 are power supplies, timers, and drive mechanisms used in the operation of die bonder 20. An image color monitor 27 can be used to display the real time image as seen by camera 21. Associated with color monitor 27 is a system key pad 26 and a vision computer 24. These units can be located remotely from die bonder 20 and can be connected to a plurality of die bonders.

Figure 3:
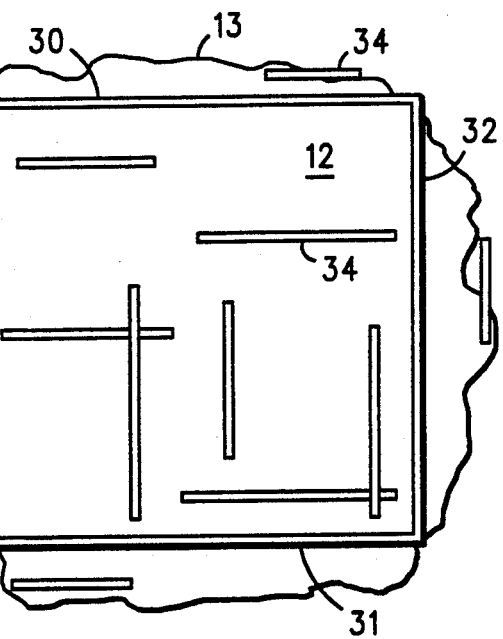
FIGS. 3 and 4 illustrate an inspected article with superimposed data thereon.

FIG. 3 illustrates an image of chip 12 and epoxy 13 from FIG. 1. Also illustrated are the edges of chip 12 along with noise edges 34 on and off of chip 12. In order to determine the die location and orientation or rotation, an image of die or chip 12 must be obtained. A gray level edge enhancement is then performed on the gray scale image. Changes or discontinuities of luminance across an image is a fundamentally important primitive feature of an image and provides an indication of the physical boundaries of objects within the image. An edge transition of luminance discontinuity can be viewed as single dimensional. As an example, as viewing the luminance or gray level value of the image of FIG. 3 from top to bottom, luminance transitions are noted for epoxy 13 and change rapidly when approaching top edge 30 of chip or die 12. Continuing across the surface of chip 12 towards lower edge 31 there is encountered additional transitions of luminance due to surface configuration and interconnect lines on the surface of die 12. These are illustrated as edges of non-interest or noise edges 34. Another large transition of luminance is encountered at edge 31 due to the transition between die 12 and epoxy 13. The same luminance transitions are encountered when scanning from left to right. Transitions are characterized by gray level height and slope across an image region, thus known as gradients. An edge exists if the gradient is larger than a specified critical value of the particular edge enhancement filter being used. Edge enhancement filters are generally classified into two categories of linear or non linear. The major advantage of linear filters being computational speed, whereas for the non-linear filters the advantages are accuracy and robustness.

The above enhancement technique is useful in identification of edges qualified only by their surrounding neighborhood gray level magnitude differences. There are other such edge filters which function similarly, but with the added weighting of "edge direction". The Compass Gradient method convolves the original image with specified gradient masks. These masks weight the particular direction of interest. Below are four of the 3×3 convolution masks; north, south, east, west.

$$
\text{North } H = \begin{array}{ccc} 1 & 1 & 1 \\ 1 & -2 & 1 \\ -1 & -1 & -1 \end{array}
$$

$$
\text{South } H = \begin{array}{ccc} -1 & -1 & -1 \\ 1 & -2 & 1 \\ 1 & 1 & 1 \end{array}
$$

$$
\text{East } H = \begin{array}{ccc} -1 & 1 & 1 \\ -1 & -2 & 1 \\ -1 & 1 & 1 \end{array}
$$

$$
\text{West } H = \begin{array}{ccc} 1 & 1 & -1 \\ 1 & -2 & -1 \\ 1 & 1 & -1 \end{array}
$$

The compass names indicate the slope direction of maximum response; for example, the East gradient mask produces a maximum output for horizontal luminance changes from left-to-right. Also, the masks have zero weighting; sum of the array elements is zero; so that there is no output response over constant luminance regions of the image.

Figure 4:
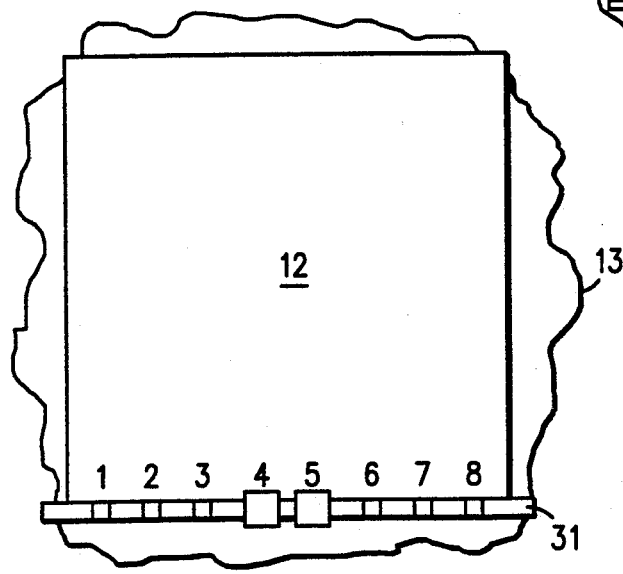

Generally the surface of integrated circuit die 12 and the surrounding region contains significant noise edge information. Each individual direction edge image is shifted and summed (correlated) in a fashion representative of the discretely identified edge point offset references. Each discrete point has been assigned a weighting or voting value affecting the accumulated correlation sum total. As an example, lower direction edge image 31 is illustrated in FIG. 4 and has been assigned discrete point offsets as indicated. Points 1, 2, 3, 6, 7, and 8 have a weighting value of one, and points 4 and 5 have a weighting value of two. The central points are weighted heavier than the points towards corners because the corners may be chipped or they may have broken away. Provided that all of the specified discrete edge points are present, shifting and summing lower edge image 31 in the horizontal direction, centered about the vertical die center, would accumulate to a gray scale image value of 10 maximum using the values illustrated in FIG. 4. One might require that sixty percent or greater of the possible point voting be present to ensure correct edge feature correlation. The centroid of this sum image blob would then indicate the location of lower edge 31 feature. For locating the die position, all four independent direction edge images 30, 31, 32, and 33 are shifted and summed in a similar fashion with one another. The accuracy and noise immunity of such a feature correlation method rely upon quantity of discrete points, weighting of the discrete points, and the required voting percentage of the total correlated points.

The rotation of die or chip 12 is determined in a similar fashion. Two opposing directions edges such as top and bottom or left and right side are shifted towards the center axis of chip 12 by half the vertical or horizontal die side dimension and then correlated together. A best fit line through the correlated points is calculated. The slope of this line (after adjusting for image camera vertical/horizontal aspect ratio) would be representative of the rotation or alignment of chip 12.

The location and orientation of fingers or leads 16 of leadframe 10 can be identified by a similar method as indicated for die 12.

The edge enhanced image must be intelligently thresholded so as to extract the predominant edge features of interest. Choosing a single threshold value $T_1$ low enough to satisfy needed edge information generally would also include undesirable noise edge features. Therefore a slightly higher threshold value $T_2$ is also chosen enabling only edge points within predominant edge features. Conditionally dilating the $T_2$ image (seed edge points) with the $T_1$ image (gross edge points) would conditionally grow the prominent edge features of interest, yet not at the expense of growing any noise edge points. In other words, the high threshold value $T_2$ is grown into the low threshold values $T_1$. This procedure will not permit growing an edge into a region where it does not exist at a lower value.

Assuming a reasonable threshold value $T_1$ has been established, yielding binary edge image $E_1(j,k)$. This edge image most likely will contain "edges of interest" and "noise edges". Assuming the edges of interest have more predominant slope and gradient characteristics within edge enhanced image $G(j,k)$, increasing the threshold $T_1$ a small amount, dT, the $T_2=T_1+dT$ will result in a noise reduced binary edge image $E_2(j,k)$. A larger dT value will result in removal of most all noise edge information, yet also reduce interested edge information. This reduced interested edge information is called the "seed edges".

To regain the entire interested edge information, but not at the expense of re-adding the noise edge information, is a technique called Seed Growing. The idea behind seed growing is to repeatedly conditional-dilate the seed image $E_2(j,k)$ with the full image $E_1(j,k)$. This method will allow the interested edge information, beginning at the seed points represented in $E_1(j,k)$, to "grow" to the limit of that represented in $E_2(j,k)$, absent of the noise edge information. The resulting binary edge image would contain only the edges of interest. Such an imaging technique would be considered within the spectrum of "Shape Morphology" image processing.

The method just described for determining the location of an item or article such as semiconductor die 12 is summarized in FIG. 5. An image to be inspected must be obtained and then an edge enhancement is performed and the proper filter or convolver is used. The data obtained is then used in a seed growing process in order to eliminate some of the noise edge points. The seed growing process involves expanding or dilating the higher threshold values with the lower threshold values to grow the prominent edge features of interest. Direction edge correlation is then performed in order to determine the alignment or rotation of the article being inspected. The resulting information is then analyzed and compared to determine whether the location and alignment are acceptable or not. If the location and orientation are not acceptable an operator will have to intervene to command the system to continue or to insert new parameters into the system. If the orientation and alignment seem to be getting worse, adjustments can be made for new parameters.

The gray scale or gray level surface of the article under inspection is characterized (inspected) by means of comparing a taught article surface to a run-time article surface. In other words, a comparison is made between a standard or known article surface and the surface of an article undergoing inspection. The comparison method, "Normalized Area Averaging", is described as follows. The surface is partitioned into smaller 'n×n' pixel adjacent or slightly overlapping neighborhood sub-regions. The average gray scale value for each of the sub-region neighborhoods is determined. This matrix of averaged sub-region values can be treated as the article surface's gray scale signature. Assume there are a total of 'm' sub-regions. For comparison to the next article surface, subtract the taught article surface's signature matrix from the run-time article surface's signature matrix, element for element. The magnitude of these resulting element values will be a function of article surface differences and variations due to lighting luminance. To separate out the lighting variation effect, sort the m elements from largest to smallest into array M[1 ... m]. The following invariant indices can be calculated.

$$I_1 = M[m/2] - M[1]$$

$$I_2 = M[m] - M[m/2]$$

Thus $I_1$ and $I_2$ will be invariant to lighting luminance changes, yet sensitive to article surfaces variations or differences. Article surface acceptance/non-acceptance decision rules are based upon the magnitude of these indices. Ideally, $I_1$; and $I_2$ would be equal to zero in the case of a perfect article surface-to-die surface match. The sensitivity of this gray scale surface characterization method is dependent upon the size 'n' of the sub-region neighborhoods.

The use of die bonder 20 illustrated in FIG. 2 consists of variables and attributes type data. The process sampling and control methodology are dependent upon which type data is to be measured and controlled. Variable type data would be that which is analog in nature and has a range of acceptable values. As an example, variable data is data resulting from observations on a numerical characteristic of an element. Attribute type data is binary in nature and is either present or absence, good or bad. Attribute type data is data resulting from observations on a characteristic of an element that is either there or not there.

Variable sampling is used to measure a process variation, which is the distance 'd' between two normal distribution sample means. A sample consists of a number of individual elements. The sample would be representative of the population if it contained enough elements. To be capable of accurate statistical measurement of such a process variation, the "necessary number" of elements within a sample must be collected before attempting to characterize the sample. The necessary number of elements "n" within a given sample is dependant upon the producer's risk 'p' (the probability that an improper process control alarm will be acted upon), the customer's risk 'c' (the probability that a proper process control alarm will be ignored), and the size of the process variation 'd' to be measured. The following equation defines 'n'.

$$n = (s*(Z(p/2) + Z(c))/d)^2$$

Z(p) = producers risk index
Z(c) = customers risk index
d = process variation
s = standard deviation of the population Thus assuming c=5%, p=1%, one must collect approximately n=288 individual elements in order to statistically determine a process variation of d=0.25s or greater. Or for determining a process variation of d=0.5s or greater, one must collect approximately n=72 elements. For example, if die location is to be controlled to the accuracy of 0.5s (½ of the die bond location standard deviation), one must measure the die location on 72 different instances before attempting to determine the die's position (sample mean).

Attribute sampling in this instance is used in a "continuous" as opposed to a "batch" fashion. Attribute sampling is useful for controlling or enforcing a specified "acceptable quality level (AQL)" or process "yield". The continuous attribute sampling method used in this process control application is the Dodge-Torry CSP3 technique. The sampling plan is dependent upon; observation frequency 'f', acceptable quality level 'AQL', and quantity of 100% inspected elements 'i'. The decision rule flow chart (FIG. 6) displays the algorithm's logic.

For example, referring to FIG. 6, if one desires to control the inspection attribute die surface defects to the level of AQL=0.4% (yield of 99.6%), taking die surface measurements every f=10 elements, then i=275 100% inspection elements must be measured before going into a 1 in 10 element sampling mode (provided no defects were discovered).

By now it should be appreciated that there has been provided a real time automatic visual process using parameter measurement as statistical control functionality. A novel robust gray scale imaging technique is used for intelligently thresholding the gray scale edge enhanced image to attain a binary direction edge feature of interest of an article being inspected. The invention allows accurate and fast determination of an article's location and rotation and an inspection of the article surface to determine whether the article is a proper article or whether foreign matter on the surface would prevent the article from being acceptable. In addition, the novel measurement data statistical summarizing techniques used for both the attributes and variable type data in a manufacturing process is disclosed. Statistical sampling, both variable and attribute data, is used for real time feedback process control of the die bond process.

What is claimed is:

1. A method for automatically inspecting semiconductor die comprising:
   obtaining an image of the semiconductor die;
   performing a direction edge enhancement and selecting a first and a second threshold value of an edge enhanced image;
   conditionally dilating the second threshold value with the first threshold value to conditionally grow prominent edge features; and
   determining the semiconductor die location and rotation by correlating discrete die perimeter edge points, wherein the discrete die perimeter edge points are weighted, shifted and summed to perform the correlating.

2. The method of claim 1 further including dividing a top surface of the semiconductor die into a plurality of regions to cover the top surface;
   determining an average gray level value for each of the plurality of regions; against a predetermined average gray level for a known semiconductor die;
   subtracting predetermined average gray level values of a known semiconductor die from the determined values to obtain difference values;
   sorting the difference values from largest to smallest; and
   normalizing the sorted difference values to determine acceptability of the semiconductor die.

3. The method of claim 1 wherein the correlating discrete die perimeter edge points is done by weighting the discrete edge points and shifting and summing discrete edge point values.

4. The method of claim 1 wherein rotation of the semiconductor die is done by shifting the discrete die perimeter edge points of two opposing edges toward center of the die by half of dimension between the opposing edges; calculating a best fit line through the shifted points; and determining rotation of the die from slope of the best fit line.

5. The method of claim 2 wherein sorting the difference values includes sorting the values into a matrix array to obtain calculated indices which are invariant to lighting luminance changes.

6. A method for automatically inspecting a semiconductor die, comprising:
   determining average gray level value for each of a plurality of regions into which a surface of the semiconductor die has been divided;
   subtracting the average gray level values against predetermined values for each of the plurality of regions to obtain difference values;
   sorting the difference values from largest to smallest value to obtain normalized values;
   calculating difference between a normalized center value and a smaller value to obtain a first index;
   calculating difference between the normalized center value and a largest value to obtain a second index; and
   determining acceptability of the semiconductor die from magnitude of the first and second indices.

7. The method of claim 6 further including:
   performing a direction edge enhancement;
   selecting a first and a second threshold of a resulting edge enhanced image to extract predominant edge features and wherein the second threshold is a higher value than the first threshold;
   dilating the second threshold values with first threshold values to conditionally grow prominent edge features and avoiding growing low threshold noise edge points thereby defining meaningful semiconductor die edges.

* * * * *